J. D. RODGERS.
CULTIVATOR.
APPLICATION FILED OCT. 7, 1920.
1,418,675.
Patented June 6, 1922.
2 SHEETS—SHEET 1.
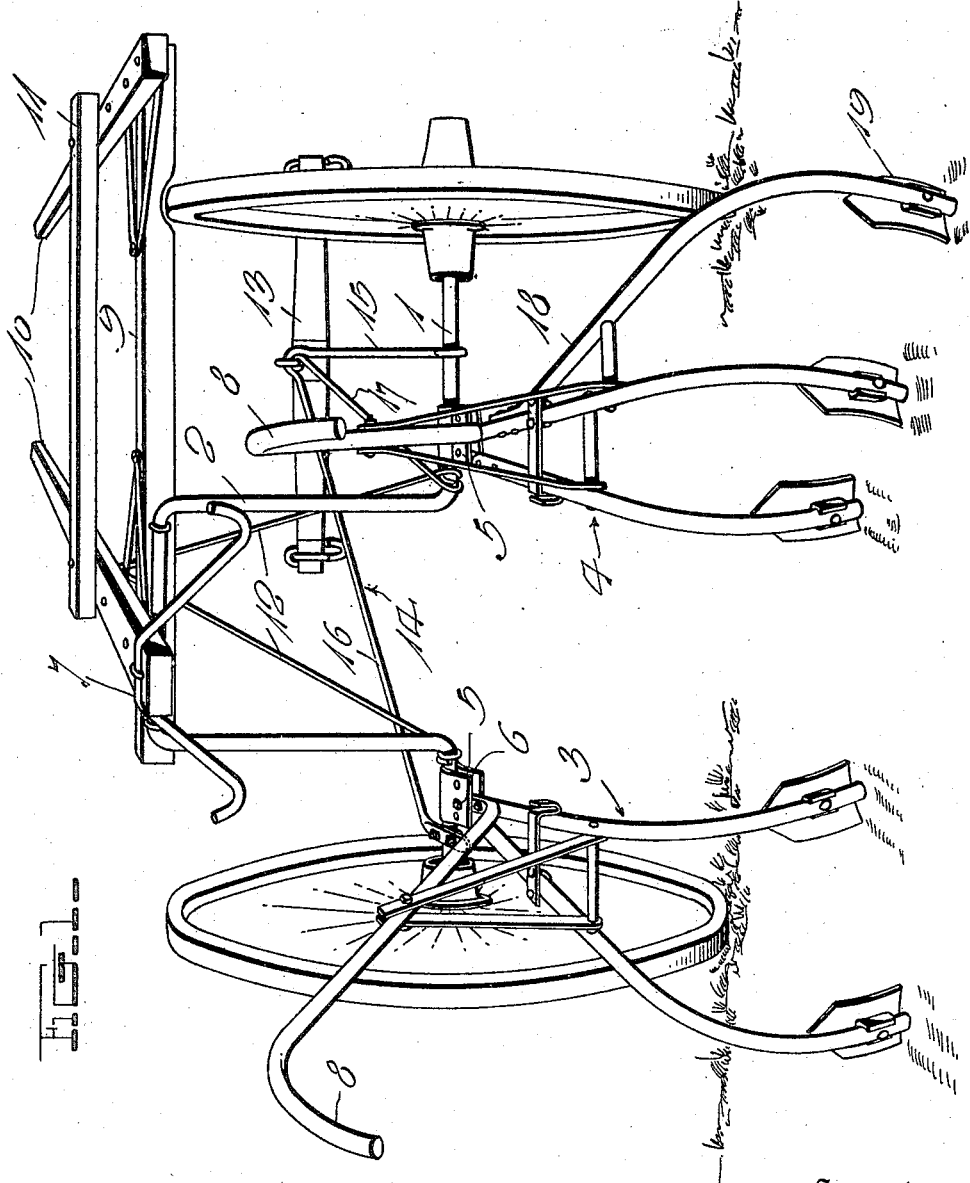
Witness
H. Woodard
Inventor
J. D. RODGERS
By H. B. Wilson & Co.
Attorneys

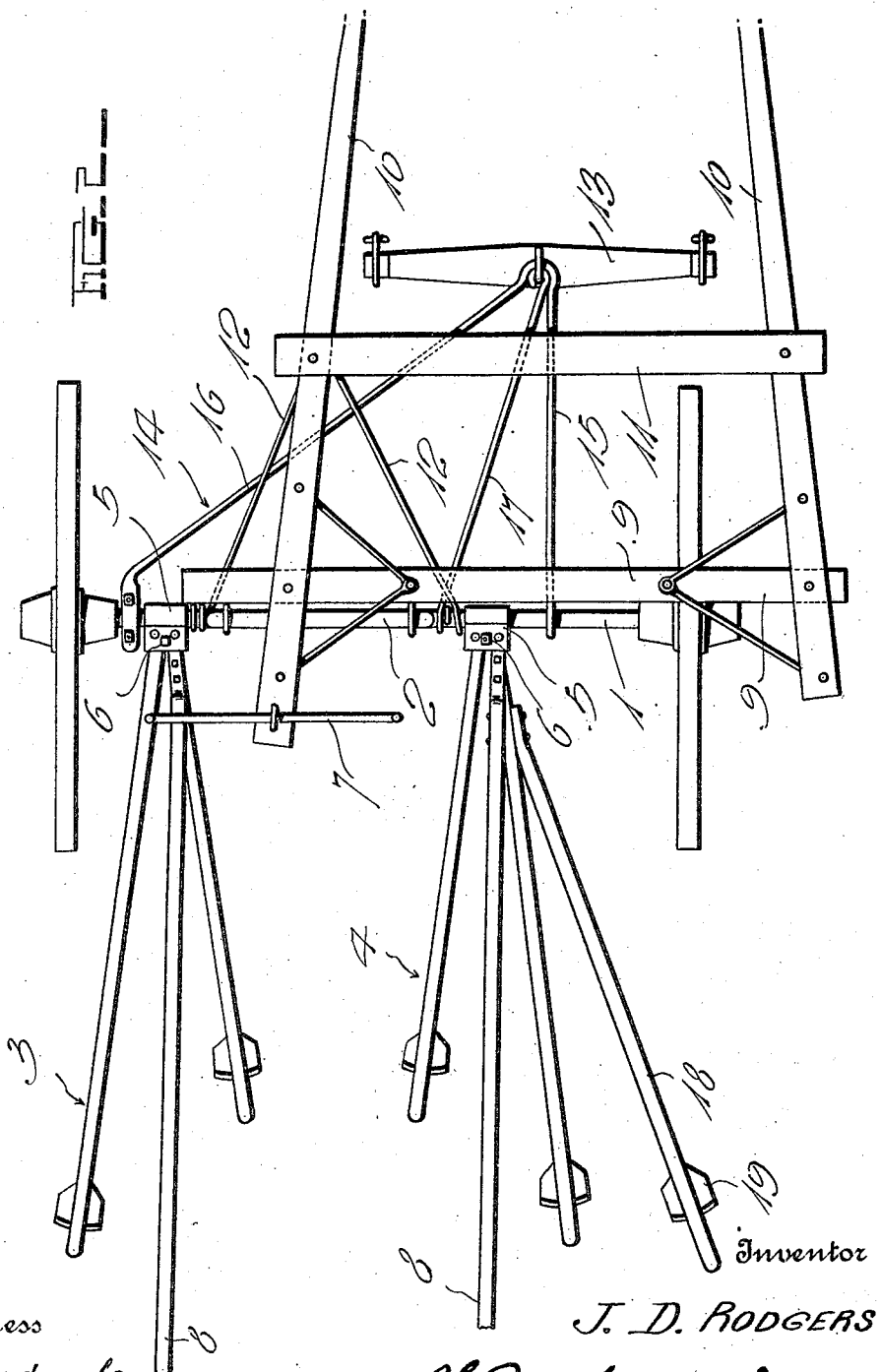

UNITED STATES PATENT OFFICE.

JAMES D. RODGERS, OF SILVERTON, OREGON.

CULTIVATOR.

1,418,675. Specification of Letters Patent. Patented June 6, 1922.

Application filed October 7, 1920. Serial No. 415,257.

*To all whom it may concern:*

Be it known that I, JAMES D. RODGERS, a citizen of the United States, residing at Silverton, in the county of Marion and State of Oregon, have invented certain new and useful Improvements in Cultivators; and I do declare the following to be a full, clear, and exact description of the invention, such as will enable others skilled in the art to which it appertains to make and use the same.

This invention relates to improvements in cultivators, having particular reference to a straddle-row cultivator which is especially designed to be drawn by a single animal.

The main object of the invention is to generally improve upon devices of this class by the provision of one which is provided with novel hitching means for the horse or other animal, which means is so positioned with respect to the body portion of the machine, that it enables the earth-working implements to straddle the rows and at the same time permits the horse to travel between the rows.

The foregoing arrangement of the hitching means or thills tends to eliminate side draft and overcome the usual see-saw movement of the cultivator. However, I wish to further guard against this movement of the machine. Therefore, another object of my invention is to provide novel means for overcoming these circumstances, this means being extremely simple and inexpensive and merely in the form of a supplemental earth-working implement.

A still further object of the invention is to produce a cultivator which is simple in construction, effective in operation, strong, durable, and one which embodies novel mounting means for positioning the singletree in the proper position beneath the thills.

Other objects and advantages of the invention will be apparent during the course of the following description.

In the accompanying drawing, forming a part of this specification and in which like numerals are employed to designate like parts throughout the same:

Figure 1 is a perspective view of a cultivator constructed in accordance with my invention.

Figure 2 is a top plan view thereof.

Referring to the drawings, wherein the preferred embodiment of my invention is clearly illustrated, it will be seen that the numeral 1 designates a wheel-supported axle which includes, intermediate its ends, an arched portion 2. This axle carries two independent and separate sets of earth-working implements 3 and 4 respectively, these extending rearwardly from the axle, being positioned adjacent the supporting wheels, and being spaced from each other to permit them to straddle the rows. These earth-working implements may be mounted in any suitable way on the axle, being preferably mounted by means of clamps 5, the arms which carry the blades, being in turn pivotally and adjustably connected to these clamps as indicated at 6. This construction permits the earth-working implements to be adjusted toward and from each other and permits them to be swung up and connected to the hooked supporting member 7 which places them entirely out of the way when not in use. The earth-working implements, will of course, be provided with suitable operating handles 8. The construction and arrangement so far described is old and well known and forms no part of my invention.

One of my improvements as before intimated, resides in the construction and arrangement of the novel hitching means disclosed. This means comprises a bar 9 which is connected adjacent one of its ends to the arched portion of the axle, it extending in parallelism with the latter, or transverse with respect to the body of the machine across and beyond the wheel at the right-hand side of the machine. This bar serves to support a pair of spaced thills 10 which extend forwardly and are connected intermediate their ends and properly spaced by means of a cross-piece 11. It is to be noted that the inner thill is in longitudinal alignment with the longitudinal center of the axle, while the remaining thill is positioned at a point beyond the above named wheel. This arrangement of parts permits the horse to walk between the rows, which result is not otherwise possible when the hitching means is arranged in the center of the machine. If desired, converging braces 12 may be employed for the purpose of increasing the rigidity of the device and better supporting this hitching means. The singletree 13 which also forms a part of this hitching means is independent of the thills and supported directly beneath them by means of a draft-rod or member 14 of substantial V-formation. While on this construction, I wish to mention that the rod 14 is preferably constructed from a single length of material and is bent to form a pair of arms 15 and 16, the first named arm being shorter than the latter and being connected to the axle 1 adjacent the right-hand wheel, and extending forwardly from the latter at right angles with respect thereto. The remaining arm 16 extends rearwardly from the arm 15 and is connected to the axle adjacent the opposite wheel, this arm being arranged diagonally with respect to arm 15. It follows that by pivotally connecting the singletree at the point of connection of the two arms, it is properly positioned beneath the thills. To further increase the rigidity of the device and to equalize the strain on the arms 15 and 16, an additional brace 17 is employed.

It has been before intimated that, even though, this particular construction and arrangement of the thills and singletree permits the draft animal to walk between the rows and serves partially to overcome the see-saw movement of the cultivator, I employ novel means for assisting in preventing such movement of the machine. This means is merely in the form of an arm or beam 18 which is detachably connected to one of the arms of the earth-working implement 4, this arm 18 carrying, as do the other arms, a suitable earth-engaging blade 19. It is to be noted that the free end of this arm is positioned approximately in alignment with the right-hand wheel. The tendency of the machine without this improved means, would be to swing the frame of the machine in a circle from right to left. However, by employing this improved device and anchoring it in the ground, this movement of the machine is prevented and it is caused to move directly forward at all times, especially in view of the fact that it co-operates in conjunction with the peculiar arrangement of the hitching means.

Straddle row cultivators now on the market in most of the cases require two draft animals, and since all farmers cannot well afford the upkeep of such animals and cannot buy such machines, which are rather expensive, it will be seen that a cultivator embodying my improvements which requires but a single draft animal, will be found extremely desirable and advantageous. With the construction and arrangement of parts shown and described, it will be seen that an extremely light and serviceable machine is provided which is such that the animal is permitted to walk between the rows and the earth-working implements permitted to straddle the adjacent rows. The employment of the supplemental detachable earth-working implements which includes the bar 18 and the blade 19, is extremely advantageous, in that it prevents the machine from moving sideways as it often times does. In summing up, it will be seen that the employment of this novel member for preventing such movement of the machine together with the novel arrangement of the thills or hitching means insures that the cultivator will at all times travel straight ahead instead of having the usual see-saw movement.

A careful consideration of the foregoing description taken in connection with the accompanying drawings, is thought to be sufficient to enable persons skilled in the art to which this invention relates, to obtain a clear understanding of the same, therefore, a more lengthy description is deemed unnecessary.

While I have shown and described my improved hitching means as being located on the right hand side of the machine and the side draft eliminating means as also being located at the same side of the machine, I wish it to be understood that these parts may well be reversed to position them on the opposite side of the machine when it is found necessary or desirable to have the draft animal on the left-hand side of the machine.

Since probably the best results may be obtained with the construction and arrangement of parts shown and described, this construction and arrangement is taken as the preferred embodiment of my invention. However, I wish it to be understood that various minor changes in the shape, size, and arrangement of parts may be resorted to without departing from the spirit of the invention or the scope of the subjoined claims.

I claim:

1. The combination with a cultivator including a wheel supported frame, a pair of separate earth working implements, and draft means disposed on one side of the longitudinal center of the frame; of side-draft-eliminating-means in the form of a supplemental ground engaging member, being associated with that earth working element in substantial alinement with said draft means.

2. The combination with a cultivator including a wheel-supported arched axle and independently operable adjustably mounted earth-working implements; of a pair of thills arranged on one side of the longitudinal center of the machine and extending forwardly therefrom, a singletree beneath the thills, and a side-draft-eliminating-means carried by the earth-working implements in longitudinal alignment with said thills and singletree.

3. The structure set forth in claim 2, said side-draft-eliminating-means being a detachable supplemental earth-working-implement.

4. In combination a cultivator including a wheel-supported axle and separate sets of earth-working implements extending rearwardly from said axle, draft means arranged on one side of the longitudinal center of the cultivator in front of and in alignment with one of the sets of implements, a diverging detachable bar carried by the last named set of implements, and a ground-engaging member on the free end of said bar.

In testimony whereof I have hereunto set my hand.

JAMES D. RODGERS.